2,980,733
Patented Apr. 18, 1961

2,980,733
COORDINATION COMPLEXES OF UREA AND BORON TRIFLUORIDE AND METHODS OF PRODUCING THE SAME

Frank J. Sowa, Cranford, N.J.
(305 E. 46th St., New York, N.Y.)

No Drawing. Filed July 12, 1954, Ser. No. 442,911

9 Claims. (Cl. 260—555)

This invention relates to a new class of chemical compounds consisting of coordination complexes of urea and boron trifluoride and to methods of producing and using said compounds.

I have discovered that urea and boron trifluoride combine in various ratios to produce a new series of compounds. The ratio of the combining molecules in the complexes varies depending upon the method of production but in general, the compounds of the present invention may be said to have the composition indicated by the formula

where $x$ is a number from 1 to 4. Thus, compounds having four molecules of urea combined with one, two, three or four molecules of boron trifluoride can be produced. The ratio of the urea to boron trifluoride may thus be 4 to 1, 3 to 1, 2 to 1 or 1 to 1.

These compounds can be produced by direct action between boron trifluoride and urea or by reaction between urea and compounds which liberate boron trifluoride during the course of the reaction.

Certain of these new compounds are highly soluble in water and are so non-toxic they may be used as agents for the fluorination of drinking water and for addition to dentifrices for reducing dental caries. The compounds are also useful by themselves or with other materials in producing insecticides, herbicides and textile finishing agents. They are particularly valuable as intermediates for use in the preparation of esters of carbamic acid, N-alkyl and N-aryl substituted urea, biuret and cyanuric acid. They may also be used as catalysts for promoting addition and polymerization reactions and may be used themselves or in combination with other compounds in producing condensation products. They also serve as agents for selectively separating various organic compounds, particularly to separate aromatic and various aliphatic hydrocarbons.

One of the objects of the present invention is to provide a new class of chemical compounds consisting of the coordination complexes of urea and boron trifluoride.

Another object of the invention is to provide methods for effecting reaction between urea and boron trifluoride.

A further object of the invention is to provide methods for using the compounds of the present invention.

The products of the present invention may be produced in various ways. In the preferred method, gaseous boron trifluoride is bubbled into a solution of urea in a solvent such as water or an alcohol. The urea and boron trifluoride initially combine in the ratio of four molecules of urea to one molecule of boron trifluoride and therefore the initial compound produced by reactions between urea and boron trifluoride may be referred to as

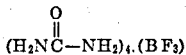

However, by continuing the addition of gaseous boron trifluoride in conducting the reaction, compounds can be produced in which two, three or four molecules of $BF_3$ are combined with four molecules of urea.

Instead of using gaseous boron trifluoride, it is possible to use various compounds of boron trifluoride such as the boron trifluoride-ether complex or those such as monoammino boron trifluoride ($NH_3BF_3$) and ammonium fluoborate ($NH_4BF_4$). When using either of the latter sources of boron trifluoride, ammonia is given off during the course of the reaction by which the new compounds are formed. However, only the 4 to 1 compound is generally produced when using monoammino boron trifluoride or ammonium fluoborate.

Equations by which the compounds of the present invention are produced when using the methods referred to above may be expressed as follows:

(1) 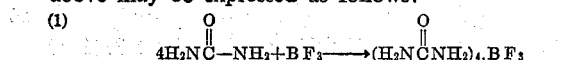

(2) 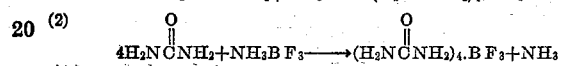

(3) 

The direct reaction between urea and boron trifluoride may be carried out in the presence of water but the extreme solubility of the reaction products in water renders this method less suitable for most procedures wherein the reaction product is to be recovered in its crystalline form.

In order to illustrate typical methods by which products of the present invention may be produced, the following examples are cited:

Example I 240 grams (4 moles) of urea were dissolved by warming the urea in 600 grams of isopropyl alcohol. Gaseous boron trifluoride was bubbled into the solution while stirring until a total of 68 grams (1 mole) of boron trifluoride had been absorbed. The reaction was exothermic and the mixture was cooled to maintain the temperature between about 60° and 70° C. On cooling the alcoholic solution to room temperature a white crystalline compound was formed and precipitated from solution. The total yield was 308 grams of a compound wherein four molecules of urea were combined with one molecule of boron trifluoride indicating quantitative conversion of the urea to the new compound $(H_2NCONH_2)_4 \cdot BF_3$. It has a melting point of 96° to 98° C. It is readily soluble in water, thus 205 g. dissolve in 100 g. of water at 27° C. causing the temperature of the water to be considerably lowered. The compound further is insoluble in benzene and Stoddard solvent. It is quite soluble in hot alcohols but sparingly soluble in cold alcohols. Thus, 40 g. of the complex may be dissolved in 100 g. of hot isopropyl alcohol while at 25° C. only 5.6 g. can be dissolved in 100 g. of isopropyl alcohol. It is stable in water and in glacial acetic acid but decomposes at elevated temperatures giving off ammonia and yielding biuret and cyanuric acid.

Example II

The method of Example I was employed using water as the solvent for the urea. A solution of the reaction product in water was obtained and the crystalline product having a melting point of 96° to 98° C. was recovered by evaporating the aqueous solution to dryness under reduced pressure.

Example III 240 grams (4 moles) of urea were dissolved in 600 grams of isopropyl alcohol containing 85 grams (1 mole) of monoammino boron trifluoride ($NH_3BF_3$). The mixture was heated to a temperature of from 60° to 70° C. and all of the material went into solution in about threequarters of an hour. The solution was thereafter refluxed for 4 hours during which time ammonia was given off at the top of the condenser. The solution was filtered while hot but no monoammino boron trifluoride was recovered. The filtrate was cooled and filtered and the crystalline precipitate obtained was dried. It had a melting point of 96° to 98° C. and the yield was 308 grams which is substantially theoretical for a product having the composition $(NH_2CONH_2)_4 \cdot BF_3$.

*Example IV*

240 grams (4 moles) of urea and 105 grams (1 mole) of ammonium fluoborate ($NH_4BF_4$) were added in 500 grams of isopropyl alcohol and the mixture was refluxed for about 16 hours. After several hours of refluxing, ammonia was given off at the top of the condenser. After the reflux period, the mixture was filtered and the filtrate cooled resulting in the precipitation of 237 grams of the white crystalline product having the composition $(NH_2CONH_2)_4 \cdot BF_3$. This product had a melting point of 96° to 98° C. and the yield equalled about 77% of theoretical.

*Example V*

The process of Example I was repeated and the addition of boron trifluoride was continued until a total of 136 grams (2 moles) of boron trifluoride had been absorbed. The temperature of the reaction mixture during the absorption of boron trifluoride was maintained below 80° C. The addition of boron trifluoride was then discontinued and the alcohol distilled off under reduced pressure. The product thus obtained was a solid at room temperature. Upon analysis it was found that this product has the composition $(H_2NCONH_2)_4 \cdot (BF_3)_2$.

*Example VI*

120 g. (2 moles) of finely ground urea was weighed in a one liter-3-necked flask fitted with a condenser, and a mechanical stirrer. 300 g. of benzene was added as an inert liquid which serves only to permit effective contact of the reactants during the process. While rapidly stirring to suspend the urea in the benzene, boron fluoride gas was added slowly through an inlet tube extending to a point near the bottom of the flask. The temperature was maintained below 40° C.

When 136 g. (2 moles) of boron fluoride had been added, the contents seemed completely saturated as no more boron fluoride was absorbed and exhibited considerable fuming in the air.

The benzene was removed and the solid product, which was insoluble in benzene, was separated by filtering. It was deliquescent in the air and melted below 90° C. The product is very soluble in isopropyl alcohol and in water.

This result indicates that the maximum combining ratio of boron fluoride with urea is 4 moles urea to 4 moles of boron fluoride, or a ratio of 1:1.

*Example VII*

The methods of Examples I and V may be carried out with further addition and absorption of boron trifluoride to produce coordination complexes having four molecules of urea combined with either three or four molecules of boron trifluoride depending upon how long the addition of boron trifluoride is continued.

The products of the present invention can be produced as described above when using other alcohols as solvents, such as, methyl alcohol, ethyl alcohol and butyl alcohol whereas other liquids such as benzene, cyclohexane and Stoddard solvent which are inert under the conditions of use may be employed as a liquid medium to facilitate stirring and better gas-solid contact between the reactants.

The compound in which urea and boron trifluoride are combined in the ratio of 4 to 1 has weak acid characteristics and is believed to ionize according to the formula

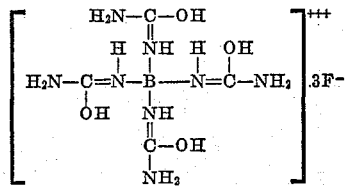

An 0.5 mole aqueous solution of $(N_2CONH_2)_4 \cdot BF_3$ has a pH value of 3.2.

This compound is also characterized by its very low toxicity as evidenced by tests on rabbits in which 50 to 100 mg. per kilogram weight of the rabbits were injected intravenously without lowering the blood sugar over a period of 7 hours. The product is less toxic to gold fish than sodium fluoride.

When used for the fluorination of drinking water it may be added at the rate of one part per one million parts of drinking water. It may also be used as an additive to dentifrice. The complexes of the present invention are also useful as constituents of agricultural sprays for use as insecticides and herbicides for the control of crabgrass. They may also be used in textile finishing compositions and as intermediates for the production of esters of carbamic acids, alkyl and aryl ureas and numerous other compounds. Since the compounds tend to decompose on heating they may be used in producing biuret, cyanuric acid and similar decomposition products.

While it has been found that the complex of urea and boron trifluoride in the ratio of 4 to 1 forms most easily and is obtainable in the form of a stable crystalline product, it is further found that complexes having a higher amount of boron trifluoride can be produced as set forth above. The latter products having higher amounts of boron trifluoride combined with the urea are frequently preferred for use as intermediates in forming other compounds either by thermal decomposition or by reaction with other agents. Those compounds wherein two to four molecules of boron trifluoride are combined with four molecules of urea are believed to have the additional boron trifluoride bonded to the terminal amino group of the various urea molecules wherein pairs of electrons are shared between nitrogen and boron atoms of the urea and boron trifluoride. Such compounds may be represented by the formula

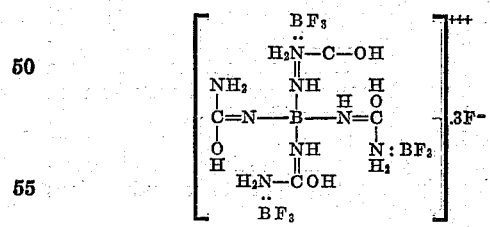

Although certain products and certain methods for producing such products in accordance with the present invention have been described above it will be apparent that many other products of the class consisting of the coordination complexes of urea and boron trifluoride can be produced. Moreover, other methods may be employed for bringing urea and boron trifluoride into reaction contact for producing the products of the present invention. In view thereof, it should be understood that the products and examples set forth above are intended to be illustrative only and are not intended to limit the scope of the invention.

What I claim is:

1. A water soluble compound having a melting point of 96° to 98° C. and consisting of four molecules of urea combined with one molecule of boron trifluoride.

2. The method of producing a complex of urea and boron trifluoride which comprises the steps of bringing boron trifluoride into reaction contact with urea in a liquid medium which is substantially inert to the reacants under the reaction conditions at a temperature not substantially exceeding 80° C.

3. The method of producing a complex of urea and boron trifluoride which comprises the step of introducing gaseous boron trifluoride into a liquid medium selected from the group consisting of water, alkyl alcohols and hydrocarbons which are inert to the reactants under the reaction conditions containing urea and maintaining the reaction mixture at a temperature not substantially exceeding 80° C.

4. The method of producing a complex of urea and boron trifluoride which comprises the steps of dissolving the urea in a solvent therefor selected from the group consisting of water, alkyl alcohols and hydrocarbons which are inert to the reactants under the reaction conditions and having a boiling point not substantially exceeding 80° C., and bringing boron trifluoride into reaction contact with said solution while maintaining the reaction mixture at a temperature below the boiling point of the solvent.

5. The method of producing a complex of urea and boron trifluoride which comprises the steps of dissolving the urea in a solvent therefor selected from the group consisting of water, alkyl alcohols and hydrocarbons which are inert to the reactants under the reaction conditions having a boiling point not substantially exceeding 80° C. and containing monoammino boron trifluoride and refluxing the mixture.

6. The method of producing a complex of urea and boron trifluoride which comprises the steps of dissolving the urea in a solvent therefor selected from the group consisting of water, alkyl alcohols and hydrocarbons which are inert to the reactants under the reaction conditions having a boiling point not substantially exceeding 80° C. and containing ammonium fluoborate and refluxing the mixture.

7. The method of producing a complex of urea and boron trifluoride which comprises the steps of dissolving the urea in a solvent therefor selected from the group consisting of water, alkyl alcohols and hydrocarbons which are inert to the reactants under the reaction conditions having a boiling point not substantially exceeding 80° C., and passing gaseous boron trifluoride into said solution while maintaining the reaction mixture at a temperature below the boiling point of the solvent and continuing the introduction of the boron trifluoride until from two to four moles of boron trifluoride have been absorbed for each four moles of the urea in solution.

8. The method of producing a water soluble complex of urea and boron trifluoride which comprises the steps of dissolving urea in an alkyl alcohol having a boiling point not substantially exceeding 80° C., introducing gaseous boron trifluoride into said solution while maintaining the temperature of the solution below the boiling point of the alcohol, and discontinuing the introduction of boron trifluoride when the weight of the boron trifluoride which has been introduced equals approximately one-fourth the weight of the urea used in forming the solution.

9. The method of producing a complex of urea and boron trifluoride having the composition indicated by the formula $(H_2NCONH_2)_4 \cdot BF_3$, which comprises the steps of dissolving the urea in an alkyl alcohol having a boiling point not substantially exceeding 80° C., bubbling gaseous boron trifluoride into said solution while maintaining the temperature in the range of about 60° C. to 70° C., and until the weight of the boron trifluoride introduced equals about one-fourth the weight of the urea.

References Cited in the file of this patent

UNITED STATES PATENTS

| | | |
|---|---|---|
| 2,611,746 | Kipp | Sept. 23, 1952 |
| 2,659,252 | Kipp | Nov. 17, 1953 |

FOREIGN PATENTS

| | | |
|---|---|---|
| 960,635 | France | Oct. 31, 1949 |

OTHER REFERENCES

Booth et al.: "Boron Trifluoride and Its Derivatives" (1949), Wiley & Sons, pp. 114–115.

Muetterties et al.: J. Am. Chem. Soc. 75, 490–491 (1953).